United States Patent [19]
Formosa

[11] Patent Number: 6,154,525
[45] Date of Patent: Nov. 28, 2000

[54] SECURITY SYSTEM WITH CALL FORWARDING ACTIVATION

[75] Inventor: Meinrad Joseph Formosa, Pennant Hills, Australia

[73] Assignee: Detection Systems, Inc., Fairport, N.Y.

[21] Appl. No.: 09/075,740

[22] Filed: May 11, 1998

[51] Int. Cl.$^7$ .................................................. H04M 11/00
[52] U.S. Cl. ............................................. 379/42; 379/211
[58] Field of Search ................................ 379/37–51, 211, 379/212

[56] References Cited

U.S. PATENT DOCUMENTS

| | | | |
|---|---|---|---|
| 4,465,904 | 8/1984 | Gottsegen et al. | 379/42 |
| 5,134,644 | 7/1992 | Garton et al. | 379/39 |
| 5,454,024 | 9/1995 | Lebowitz | 379/40 |
| 5,511,109 | 4/1996 | Hartley et al. | 379/40 |
| 5,901,211 | 5/1999 | Dean et al. | 379/211 |

OTHER PUBLICATIONS

"AT&T Security System 8000", owner's reference manual, copyright 1988.

*Primary Examiner*—Wing F. Chan
*Attorney, Agent, or Firm*—J. Addison Mathews

[57] ABSTRACT

A security system is configured to enable and disable telephone functions in response to changes in the operational state of the system, such as fully armed, partially armed and disarmed. When the system changes its operational state, it automatically sends a command to change the implementation of a telephone function, such as call forwarding. The system includes an input device for setting the system to a selected state, an interface for communicating with the telephone service provider and a controller for initiating communications through the interface and sending a command to change the telephone function.

10 Claims, 3 Drawing Sheets

SECURITY SYSTEM WITH CALL FORWARDING ACTIVATION

DESCRIPTION

1. Field of Invention

The invention relates to security systems that report the occurrence of detected events, such as fire, water, intrusion, a threat to personal security and/or the like. More specifically, the invention relates to such systems including the capability for communicating automatically with remote locations over a publicly switched telephone network (PSTN), or other suitable communication channel. In a preferred embodiment, the invention provides for communicating automatically with a telephone service provider to change telephone service functions, such as call forwarding, in response to changes in the state of the security system, such as arming and disarming.

1. Background of the Invention

Modern telephone systems offer many valuable features. Call forwarding, for example, provides for the diversion of an incoming call from one telephone number to another, as directed by the intended recipient. Telephone calls to a residence can be transferred to ring at a business or mobile phone during working hours. Business calls can be transferred to ring at a residence or answering service when the business is closed.

Such telephone communications (telecom) features are usually implemented or turned on by codes recognized by the service provider. The line is monitored by automated equipment that waits for a proper code identifying the desired function and how it is to be changed. A similar process is used to disable or turn off the function when its operation is no longer desired.

Call forwarding from a residence might be implemented by manually entering the code when a homeowner leaves for work. It might then be disabled by another manual operation when he or she returns home.

Although call forwarding is a valuable feature of many telecommunications systems, users often forget to disable the feature when they return to the location of the original number. Important calls may then be diverted to an unoccupied location. Similarly, because of this known risk of forgetfulness, the feature may be left unused even when its benefits are desired.

SUMMARY OF THE INVENTION

The present invention is directed to overcoming one or more of the problems set forth above. Briefly summarized, according to one aspect of the invention, an event detection system is configured to enable and disable telephone functions in response to changes in the operational state of the system.

According to more specific features, the event detection system is a security system having multiple states of operation, such as armed and disarmed. When the system changes its operational state, it automatically sends a command to change the implementation of a telephone function, such as call forwarding. Still more specifically, call forwarding is enabled when the system state is changed to a higher level of security, such as armed, and disabled when the system state is changed to a lower level of security, such as disarmed.

The system includes an input device for setting the system to a selected state, an interface for communicating with the telephone service provider and a controller for initiating communications through the interface and sending a command to change the telephone function.

These and other features and advantages of the invention will be more clearly understood and appreciated from a review of the following detailed description of the preferred embodiments and appended claims, and by reference to the accompanying drawings.

DETAILED DESCRIPTION OF A PREFERRED EMBODIMENT OF THE INVENTION

Figure 1:
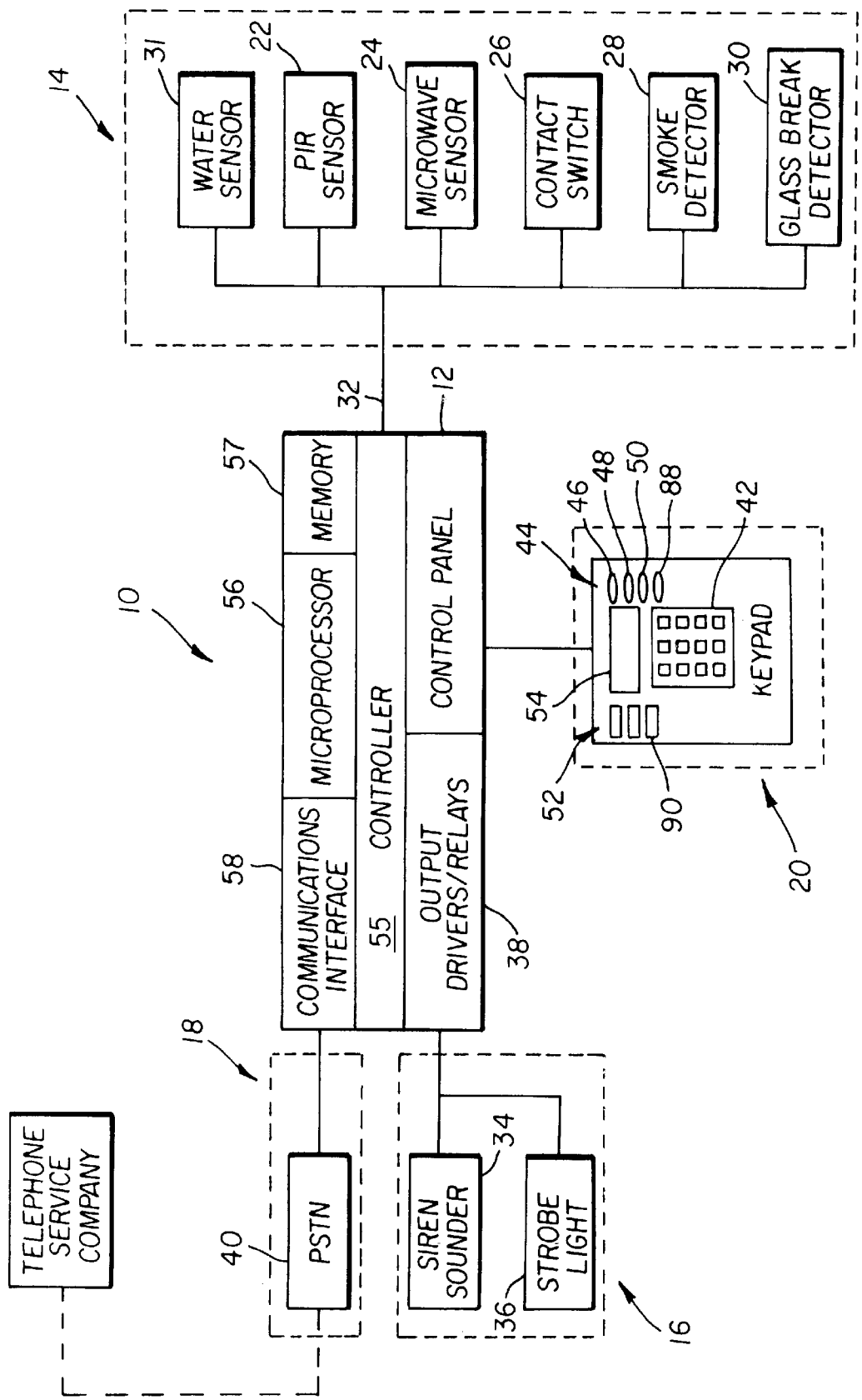
FIG. 1 is a block diagram representing an event detection system, such as a security system, incorporating a preferred embodiment of the invention.

Referring now to the drawings, and beginning with FIG. 1, a preferred embodiment of the invention is depicted including an event detecting system 10, comprising a control panel 12, a plurality of event detectors 14, output devices 16, a communications channel 18 and a system input and output device 20.

The preferred system 10 is a security system and the event detectors 14 are detectors of security related events. Examples include fire, intrusion, water entry and threats to personal security. Such events are detected, for example, with passive infrared (PIR) sensors 22, active microwave ($\mu$w) sensors 24, contact switches 26, smoke sensors 28, glass break sensors 30, water sensors 31, and the like.

The passive infrared and microwave sensors 22 and 24, detect the motion of an intruder inside a protected structure, using body heat and the Doppler effect, respectively. The contact switches 26 typically are used on doors and windows. When the door or window is opened, one of the switches either makes or breaks contact, completing or opening an electrical circuit. The smoke sensors 28 look for the by-products of combustion, such as smoke, the glass break sensors 30 listen for the sounds or other vibrations of breaking glass and the water sensors 31 monitor resistance levels that change when covered by water. All of the respective sensors report detected events to the control panel 12, through wired or wireless links 32. These and other event detecting devices are well known in the security industry and will not be described further here.

Although the event detectors 14 may be arranged in a single loop or zone, preferably they are arranged in multiple loops to support different levels and types of protection. In a home, for example, one zone might cover the periphery of the structure, using contact switches on doors and windows, while another zone might protect its interior, using passive infrared and microwave motion detectors. The peripheral zone could then be armed even when the residents are home, and they could move around inside the structure without activating an alarm. All zones might be armed, representing a higher level of security, when the building is unoccupied. Smoke and water detectors typically would be in one or more separate zones that are always on, and their state would not change with the arming and disarming of the other respective zones used for intrusion detection.

Output devices 16 include sounders 34, such as bells or sirens, and/or strobe lights 36. When control panel 12 receives reports of detected events from event detectors 14, the panel 12 analyzes the reports for validity and applies signal processing to reduce false alarms. When a valid signal is received, the panel initiates an alarm signal by activating one or more of the output devices through appropriate drivers and relays 38.

Communications channel 18 is a publicly switched telephone network (PSTN) 40. The control panel uses the telephone network to report alarms to remote monitoring services, which may then notify the police, contact the owner of the protected structure, and/or take other appropriate action according to instructions programmed in advance.

Input and output device 20, sometimes called a keypad or code pad, includes actuators and displays for controlling the security system and presenting information about its status.

An alpha-numeric keypad section 42, similar to the dialing keys on a telephone, facilitates the entry of personal identification codes that limit system access to authorized users. A proper code is entered first, to identify an authorized individual, and then the various states of operation of the system can be changed from the keypad. Of course other methods also might be used, such as wireless transmitting devices and automatic schedulers or clocks. The schedulers or clocks change system settings according to a predetermined schedule. The alpha-numeric keypad 42 also serves to input data to system memory, during installation, and later when changes are desired in system functions.

A set of actuator keys 44 are provided for changing the operational states of the system. Key 46 turns the system on, meaning that it arms all zones for detecting intruders. Key 48 turns the system off, again meaning that it disarms all zones for detecting intruders. Key 50, sometimes called the home key, turns on, or arms, only those zones that protect the periphery of the structure, permitting authorized activity inside the structure. Various levels of security can thus be set by changing the operational state of the system to fully armed, partially armed or not armed. Again, however, even when the system is only partially armed, or not armed, these terms are used in connection with intrusion detection. Smoke alarms, water entry alarms, and the like, will operate in all system states to initiate an alarm.

System status is indicated by light emitting diodes (LEDs) 52 and a liquid crystal display 54 (LCD). The light emitting diodes 52 indicate that the power is on and whether the system is armed, partially armed or disarmed. The liquid crystal display provides information and instructions pertinent to the operation of the system.

The control panel 12 contains a system controller 55, including a microprocessor 56 and appropriate memory 57, a communications interface 58, such as an auto-dialer, and the drivers and relays 38. The controller 56 receives signals from the various event detectors 14, processes the signals to reduce false alarms, sends alarm signals to a relay that operates the output devices 16, and initiates communications over the publicly switched telephone network 40. The controller 56 operates according to instructions, data and commands provided during its manufacture, entered through alpha-numeric keypad section 42 during and after its installation, and through actuator keys 44.

Figure 2:
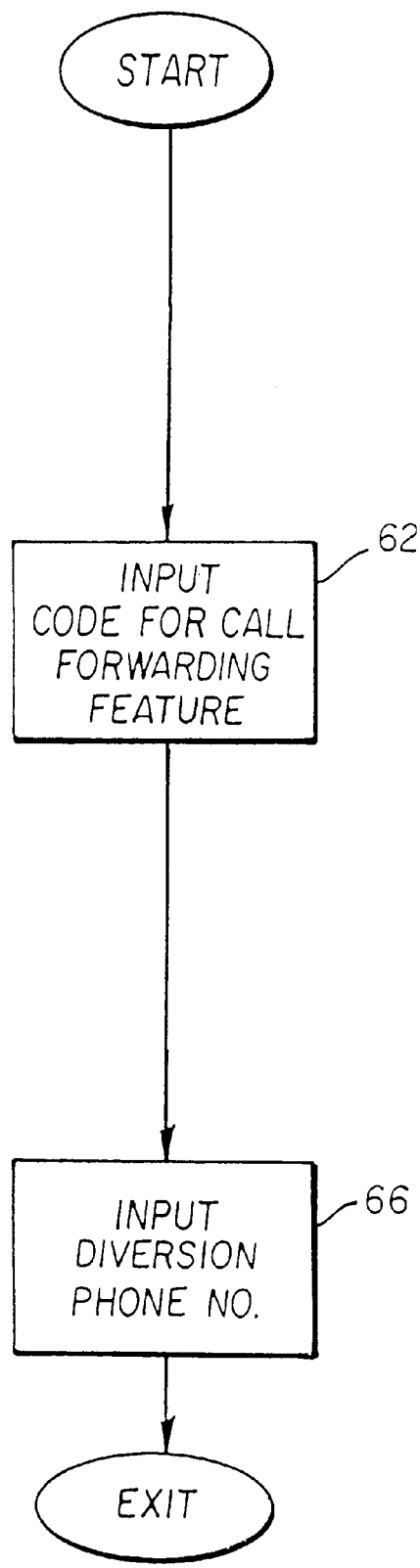
FIG. 2 is a flow chart depicting a data input operation in accordance with the preferred embodiment.
Figure 3:
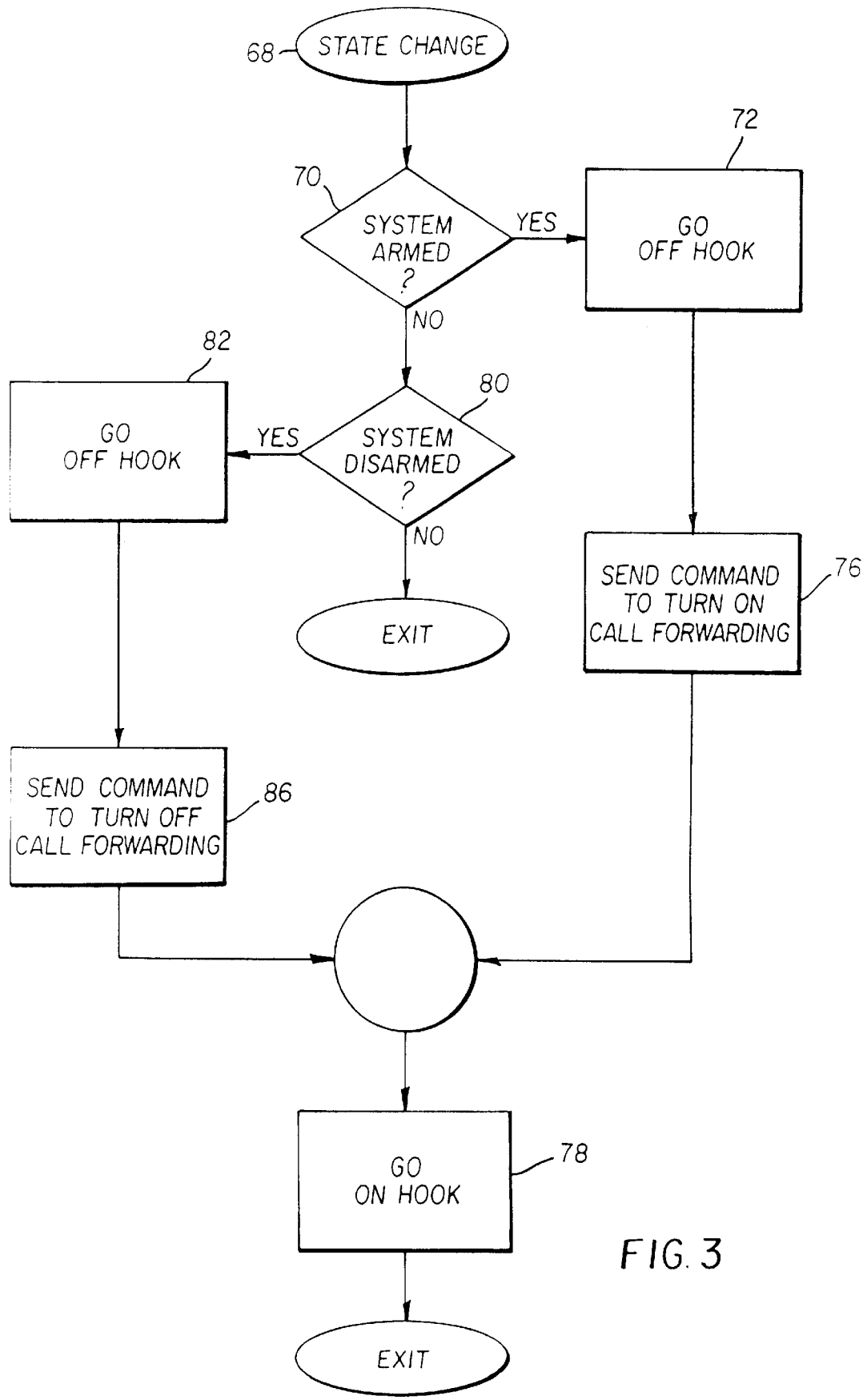
FIG. 3 is a flow chart depicting the operation of the preferred embodiment for enabling and disabling a call forwarding telephone function.

Referring now more specifically to the present invention, and to FIGS. 2 and 3, the security system is provided with the additional capability to communicate with a telephone service provider, and change a telephone function offered by that service provider, in response to changes in the operational state of the security system. Using the keypad section 42 (FIG. 1), a code is entered representing a command recognized by the service provider and directing the change in the telephone function, box 62. The same step may be repeated to enter a second code. The first code might be used to activate the feature and the second to deactivate the feature. Such codes are recognized by automated equipment at the service provider that recognizes the command and makes the changes requested by the code.

Assuming the telephone feature is call forwarding, a pound sign is entered (#), followed by 27, followed by an asterisk (*), the phone number to which calls are to be diverted and another pound sign (#), boxes 62 and 66. The pound signs indicate the beginning and end of the message. 27 is the code for the call forwarding feature and the asterisk separates the code command from the diversion number. The security system then has the data it needs to implement and cancel call forwarding. Call forwarding is implemented by the command code and diversion telephone number, which are expressed as dual tone multi-frequency (DTMF) signals, or other appropriate signals, after the dial tone. It is cancelled by sending the same command code with no diversion number.

FIG. 3 shows the operation of the security system to change a telephone function. In this preferred embodiment the changed function is call forwarding, which is activated or deactivated in response to changes in the operating state of the system. Such changes occur when the system switches between higher and lower levels of security, such as fully armed, partially armed and disarmed. When such a change in state occurs, box 68, the controller looks to see if the system was armed, or its security level was increased, box 70. If so, it waits for a dial tone and sends the command, including the appropriate phone number, to active call forwarding, boxes 72, and 76. It then hangs up, box 78. If, on the other hand, the change in state was to disarm, or a decrease in the security level, box 80, then the controller sends the command to deactivate call forwarding, boxes 82, and 86. It then hangs up, box 74.

One of the actuator keys 88 (FIG. 1) may be used to turn this feature of the security system on or off, and one of the light emitting diodes 90 may indicate its status. When it is on, the call forwarding commands are sent automatically when an appropriate change occurs in the state of operation of the system. When it is off, the call forwarding commands are not sent.

It should now be apparent that an improved security system has been provided that enhances the use of telephone functions, such as call forwarding. The features are enabled and disabled automatically in response to normal use of the security system, and a status light on the keypad may be used to remind the user that the system is programmed to make the changes. Valuable telephone features should be used more often, since a lapse of memory will less likely result in the forwarding of a telephone call to an unoccupied location.

While the invention is described in connection with a preferred embodiment, other modifications and applications will occur to those skilled in the art. The claims should be interpreted to fairly cover all such modifications and applications within the true spirit and scope of the invention.

PARTS LIST

| Reference No. | Part |
| --- | --- |
| 10. | Event detecting system |
| 12. | Control panel |
| 14. | Event detectors |
| 16. | Output devices |
| 18. | Communications channel |
| 20. | Input & output device |
| 22. | PIR sensors |
| 24. | Microwave sensors |
| 26. | Contact switches |
| 28. | Smoke sensors |
| 30. | Glass break sensors |
| 31. | Water sensor |
| 32. | Wired or wireless links |
| 34. | Sounders |
| 36. | Strobe lights |
| 38. | Drivers & relays |
| 40. | PSTN |
| 42. | Keypad section |
| 44. | Actuator keys |
| 46. | On key (arming) |
| 48. | Off key (disarming) |
| 50. | Home key (partially arm) |
| 52. | LEDs |
| 54. | LCD |
| 55. | System controller |
| 56. | Microprocessor |
| 57. | Memory |
| 58. | Communications interface |
| 62–86 | (even numbers) are flow diagram steps. |
| 88. | Actuator key |
| 90. | LED |

I claim:

1. A control panel for a security system; said control panel comprising:

a communications interface adapted for coupling to and communicating over a publicly switched telephone network;

a controller settable to multiple states of operation including a first state and a second state, said first state providing a different level of security than said second state; said controller responding to changes in said setting to initiate communications through said communications interface with a provider of services for said publicly switched telephone network, including a command to change telephone functions provided by said service provider.

2. The invention of claim 1, wherein said telephone function is call forwarding and said controller sends a command enabling said call forwarding function in response to said controller switching to said first state and sends a command disabling said call forwarding function in response to in response to said controller switching to said second state.

3. A security system having multiple states of operation including a first state of operation and a second state of operation providing a lower level of security than said first state of operation, said system including a device for switching said system between said first state and said second state and a communications interface for communicating over a publicly switched telephone network; said system comprising:

a controller responding to said switching to initiate communications over said publicly switched telephone network with a provider of services for said communications network, said communications including a command to: a) enable call forwarding when said system switches into said first state and b) disable said call forwarding when said system switches into said second state.

4. The invention of claim 1, wherein:

said security system is located in a structure having an interior region surrounded by a perimeter;

said security system includes a protection zone covering said interior region; and, said security system protects said interior zone in said first state, and does not protect said interior zone in said second state.

5. A security system; comprising:

a system controller;

a plurality of event detectors reporting the occurrence of predetermined security related events to said system controller;

a keypad disposed for communicating with said system controller and including at least one actuator for changing the state of arming of said system; and, a communications interface for communicating with a publicly switched telephone service provider;

wherein said system controller includes a setting in which said controller responds to changes in said arming state by initiating a communication to said telephone service provider including a command changing a telephone function provided by said service provider.

6. The invention of claim 5, wherein said event detectors include detectors of one or more events selected from the class of: an intruder detector, a fire detector, a water detector.

7. The invention of claim 6, wherein;

said system: a) has an armed state in which said system initiates a predetermined alarm signal in response to said occurrence reporting; and, b) a disarmed state in which said system does not initiate said predetermined alarm signal in response to said occurrence reporting; and, said command enables a telephone function in response to said armed state and disables said telephone function is response to said disarmed state.

8. The invention of claim 5, wherein said telephone function is call forwarding and said controller sends a command initiating said call forwarding function in response to an increased level of arming of said system and sends a command canceling said call forwarding function in response to a decreased level of arming of said system.

9. A security system having alternative levels of arming, an input device for setting said system to said respective levels and a communications interface for communicating over a publicly switched telephone network; characterized in that:

said system includes a controller responding to said setting by initiating a communication to a phone service provider over said publicly switched telephone network, said communication including a command to initiate call forwarding in response to an increase in said security level and cancel call forwarding in response to a decrease in said security level.

10. The invention of claim 9, wherein said alternative states include an armed state and a disarmed state.

* * * * *